United States Patent [19]

Klein

[11] 4,329,610

[45] May 11, 1982

[54] ARMATURE WINDING PATTERN FOR AN ELECTRIC MOTOR

[75] Inventor: Henry Klein, Baltimore, Md.

[73] Assignee: Black & Decker Inc., Newark, Del.

[21] Appl. No.: 140,260

[22] Filed: Apr. 14, 1980

[51] Int. Cl.³ .............................................. H02K 3/16
[52] U.S. Cl. .................................... 310/220; 310/198
[58] Field of Search ......... 310/198, 185, 203, 220–225

[56] References Cited

U.S. PATENT DOCUMENTS 3,733,506 5/1973 Jaffe et al. ...................... 310/220 X

*Primary Examiner*—Donovan F. Duggan
*Attorney, Agent, or Firm*—Harold Weinstein; Edward D. Murphy; Walter Ottesen

[57] ABSTRACT

An armature winding distribution for an electric motor divides each armature coil into first and second coil sub-sections inter-distributed with one another so that the first and second coil sub-sections of an armature coil undergoing commutation at one of the brushes are coupled, respectively, to the coil sub-section of an armature coil about to undergo commutation by the other brush and the coil sub-section of another armature coil having just completed commutation by the other brush. Excess energy in the armature coil undergoing commutation by the first-mentioned brush is transferred to a coil sub-section of the coil just about to undergo commutation and/or a coil sub-section of the coil having just completed commutation by the other of the brushes. The armature winding distribution improves commutation and substantially reduces brush sparking and the generation of electromagnetic interference (EMI) across a wide range of frequencies. Brush erosion is reduced to provide extended brush and commutator life and the need for EMI suppression components in motor-driven devices is greated reduced. The winding distribution is suitable for motors designed for a preferred direction of rotation as well as so-called neutral motors designed for bi-directional applications.

26 Claims, 6 Drawing Figures

ARMATURE WINDING PATTERN FOR AN ELECTRIC MOTOR

BACKGROUND OF THE INVENTION

1. Field of the Invention

The present invention relates to electric motors and, more particularly, to electric motors having armature winding patterns or distributions that improve commutation and reduce brush sparking and the generation of electromagnetic interference (EMI) during motor operation.

Typical wound-armature electric motors in common use in power tools and appliances utilize an armature having a plurality of wound coils that are serially connected together to define an armature circuit with the ends of each coil connected to adjacent commutator bars. The winding patterns vary from the relatively elementary lap or wave winding patterns to far more complicated winding distributions.

In operation, the armature rotates through the field with the coils successively undergoing commutation as their connected commutator bars pass through the neutral zone of the motor. Although the electro-dynamics of commutation are generally of a complex nature, the direction of current flow through an armature coil is in a first direction as the coil's commutator bars move toward a brush to effect commutation of the coil winding. As the adjacent commutator bars of an armature coil pass under a brush, the brush will span the bars and establish a "make" contact with effectively and momentarily short circuits the coil undergoing commutation. Shortly thereafter, this shunting or short circuit "breaks" and the current to the coil is reversed. During the time that the coil is shorted, the current through the coil undergoing commutation can vary in a complex manner depending upon the inductive and capacitive reactances of the coil and the coil resistance as well as the current flow through the coil just prior to commutation. The breaking of the contact after commutation results in brush sparking or brush fire, the intensity of which is a function of the electro-dynamics of the motor as described above. The brush sparking causes brush erosion and contributes to commutator wear. The process of commutation, including the existance of the brush sparking, is responsible for some, if not all, the electromagnetic and radio frequency radiation generated by the motor during its operation. This electromagnetic interference is typically conducted through the power cord of the motorized device and transferred to a portion of the power distribution system with the EMI typically interferring with the operation of EMI susceptable devices on the common power circuit, these other devices typically including computers, televisions, radio receivers, and the like.

Various national and trans-national standards have been developed to limit EMI sources with these standards limiting the amplitude of the generated EMI to specific signal levels over a broad frequency range. An example of one such standard is "Limits and Methods of Measurement of Radio Frequency Characteristics of Household Electrical Appliances, Portable Tools, and Similar Electrical Apparatus" (Pub. 14, 1975) published by the Comite International Special Des Perturbations Radio-electriques (C.I.S.P.R.). This document establishes EMI radiation standards for motor-driven devices, including portable power tools, in a frequency range of 0.15 MHZ to 300 MHZ.

Traditionally, EMI generated by motor-driven appliances and portable tools has been suppressed using various types of filter networks that include capacitive and/or inductive reactances which bypass or impede the EMI signal flow. Examples of EMI filters include capacitors placed across the power line terminals to provide a low-reactance shunt path for the undesirable higher frequencies as well as more sophisticated filters that include multiple T-section and PI-section filter networks. While traditional filtering techniques have been effective to suppress EMI, the cost of the suppression devices increases the overall cost of the appliance including the cost of fabrication. In the case of portable power tools, the EMI suppression components may also add weight to the tool and tend to increase the physical dimensions of the tool since the designer must provide a tool housing that accommodates the suppression components.

SUMMARY OF THE INVENTION

In view of the above, it is a broad overall object of the present invention, among others, to provide an electric motor suitable for use in a wide variety of motor-driven devices having greatly improved commutation characteristics.

It is another object of the present invention to provide an electric motor suitable for use in a wide variety of motor-driven devices having greatly reduced EMI generation characteristics over a wide frequency range.

It is another object of the present invention to provide an electric motor suitable for use in a wide variety of motor driven devices including appliances and power tools having a winding distribution or pattern that greatly reduces electromagnetic interference generated by the tool and thereby reduces or eliminates the need for and the costs of associated EMI suppression components.

It is another object of the present invention to provide an electric motor suitable for use in a wide variety of motor-driven devices having reduced brush sparking to thereby provide reduced brush erosion and extended brush and commutator life.

It is still another object of the present invention to provide an armature for an electric motor having a winding distribution that provides improved commutation to reduce brush sparking and electromagnetic interference generated during commutation of the armature.

Towards the fulfillment of these objects and others, the present invention provides an electric motor having an armature wound with a plurality of armature coils which are interconnected to define an armature circuit. Each armature coil is divided into coil sub-sections with the sub-sections distributed about the armature so that an armature coil, when undergoing commutation by one of the brushes, has a first coil sub-section that shares common slots with and is coupled to at least one coil sub-section of another armature coil that has completed commutation by the other brush and a second coil sub-section that shares common slots with and is coupled to a coil sub-section of another armature coil about to undergo commutation by the other brush. This winding distribution permits electrical energy in the armature coil undergoing commutation by the first-mentioned brush to be coupled to the coil sub-section of the armature coil having completed commutation and/or the coil sub-section of the armature coil about to undergo commutation by the other brush to improve commutation and reduce both brush sparking and the generation of EMI across a wide frequency range.

The winding distribution reduces brush sparking with the consequent advantage of limiting or controlling brush erosion to provide extended brush operating life. In addition, the winding distribution reduces EMI generated during commutation to permit motor-driven appliances, including portable power tools, to meet or exceed EMI standards with a minimum of additional EMI suppression components and circuits and allows many motor-driven devices to be fabricated at lower cost.

DESCRIPTION OF THE FIGURES

The above-description, as well as the objects, features, and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
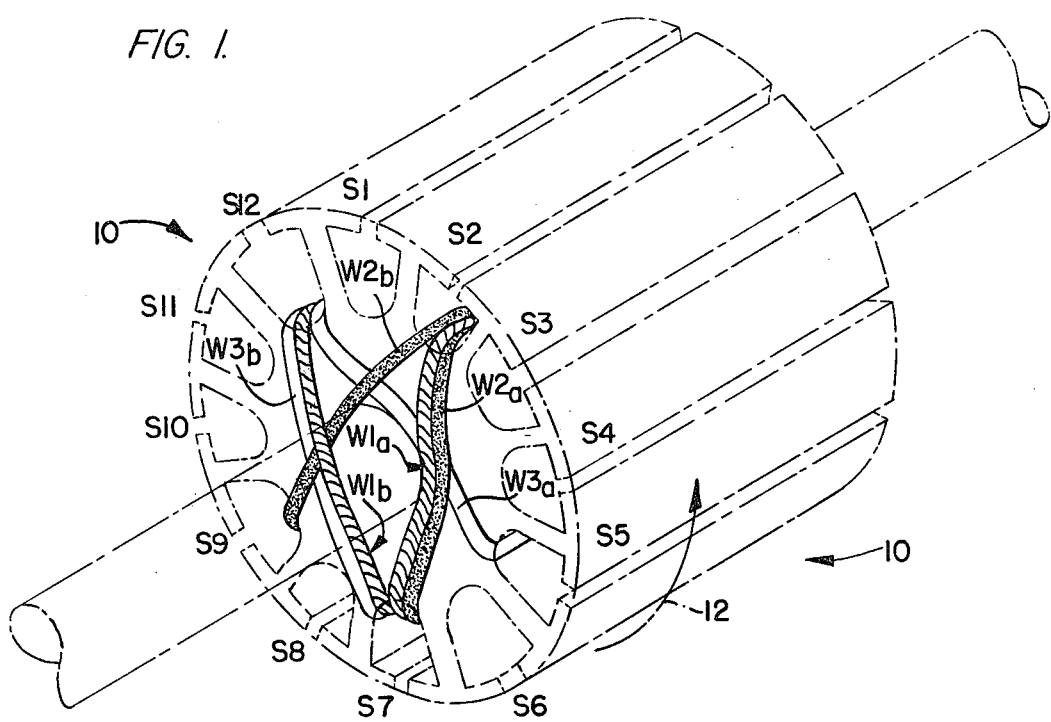
FIG. 1 is a partial pictorial representation of an armature drum having three armature coils distributed about the armature drum in accordance with the present invention.

The present invention may be best conceptually understood by consideration of the pictorial illustration in FIG. 1 showing the end portion of a conventional stacked lamination, 12-slot, one coil per slot armature drum 10 (shown in partial broken line illustration) with the slots consecutively designated by the reference characters S1 through S12 and also showing three exemplary armature coils or windings W1, W2, and W3 (shown in cross-hatched, stippled, and plain outline form, respectively) wound on the armature drum 10 and distributed in accordance with the present invention. For reasons of clarity, the slot insulation, the end face insulation, and the shaft insulation have been omitted from FIG. 1 and the armature shaft and armature drum have been shown in broken line illustration. Each of the armature coils W1, W2, and W3 is divided into two coil sub-sections or coil halves: the first coil W1 is divided into coil halves $W1_a$ and $W1_b$; the second coil W2 is divided into coil halves $W2_a$ and $W2_b$; and the third coil W3 is divided into coil halves $W3_a$ and $W3_b$. The term "coil halves or half," as used herein, is not limited to or restricted to coil sub-sections that have one-half the total number of wire turns of the armature coil but is intended to include coil halves that include more or less than one-half the total number of turns in the entire coil winding.

As shown in FIG. 1, the wire turns of each armature coil are distributed to define a "V" configuration, that is, the coil half $W1_a$ is wound between slots S2 and S7 while its associated coil half $W1_b$ is wound between slots S7 and S12; the coil half $W2_a$ is wound between slots S2 and S7 and its associated coil half $W2_b$ is wound between slots S2 and S9; and the coil half $W3_a$ is wound between slots S5 and S12 and its associated coil half $W3_b$ is wound between slots S7 and S12. The coil halves are distributed so that the coil sides of a coil half share common slots with the coil sides of another coil half so that, as explained more fully below, the coil halves of an armature coil that is undergoing commutation by one of the brushes are coupled, by virtue of the shared slots, to the coil half of an armature coil that has just completed commutation and the coil half of another armature coil about to undergo commutation by the other brush. In the example of FIG. 1, the coil sides of coil half $W1_a$ share common slots S2 and S7 with the coil sides of coil half $W2_a$, and the coil sides of coil half $W1_b$ share common slots S7 and S12 with the coil sides of coil half $W3_b$. Thus, coil sides of coil half $W1_a$ are coupled, by virtue of the coil sides in the slots S2 and S7, to the coil half $W2_a$, and the coil sides of the coil half $W1_b$ are coupled, by virtue of the coil sides in slots S7 and S12, to the coil half $W3_b$. The coupling that extends between the coil sides of the different coil halves in the common slots is both of an inductive nature and a capacitive nature.

The coil windings W1, W2, and W3 are interconnected with the commutator bars, as explained more fully below in connection with FIGS. 2A and 2B, so that when the armature 10 is rotated in the direction of the arrow 12 in FIG. 1, the armature coil W1 will undergo commutation by one of the brushes just as the armature coil W2 is about to undergo commutation by the other brush and just after the armature coil W3 has undergone commutation by the other brush. Energy in the armature coil W1 undergoing commutation by the one brush, when the commutating brush breaks the momentary short circuiting of the coil, is transferred by virtue of the coupling described above to the armature coil W2 just about to undergo commutation by the other brush and/or to the armature coil W3 just having completed commutation by the other brush. It has been found, as described more fully below, that this winding distribution provides improved commutation and effectively reduces both brush sparking and the electromagnetic interference (EMI) generated over a wide range of frequencies to reduce or partially eliminate the need for and the costs associated with EMI suppression components. In the case of an armature having two or more coils per slot, as described more fully below, energy transfer may also take place between the coil (or coils) undergoing commutation by a brush and the other coil or coils in the same slot set undergoing commutation by the same brush as well as between the armature coil about to undergo commutation by the other of the brushes and the armature coil having just completed commutation by the other of the brushes.

Figure 2A:
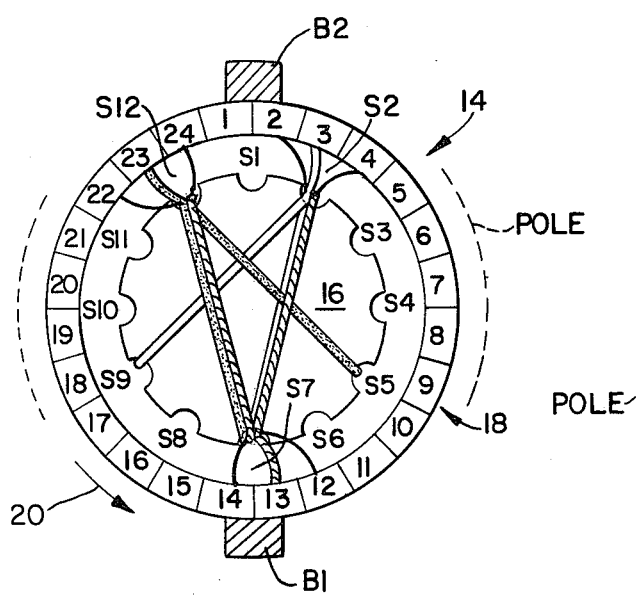
FIG. 2A is a schematic end elevational view of a 12-slot, 24-bar armature having three armature coils distributed in accordance with the present invention.
Figure 2B:
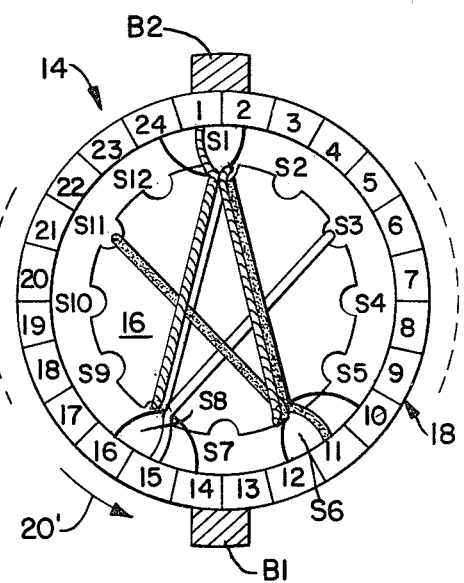
FIG. 2B is a schematic end elevational view of the 12-slot, 24-bar armature shown in FIG. 2A with three other armature coils shown distributed in accordance with the present invention.

A greater appreciation of the interaction of the armature coil winding distribution in accordance with the present invention and the actual function of the brushes during commutation may be had by consideration of the 12-slot, 24-bar (two coils per slot) armature drum 14 shown in front elevational end view in FIGS. 2A and 2B with each of these figures illustrating the armature core 16, the associated commutator ring 18, and the brushes B1 and B2. In the case of a motor designed for bi-directional applications, the brushes B1 and B2 are aligned along the neutral axis and the lead throw of the armature coils is such to provide a so-called neutral armature. In the case of a motor designed for uni-directional applications, the brushes B1 and B2 may be shifted to one side or the other of the neutral axis to assist commutation in the preferred direction of rotation, or, as is also conventional in the art, the lead throw of the armature coils may be shifted from the neutral connection pattern to achieve the same direction-of-rotation effect. The winding distribution provides improved commutation for both directions of rotation for neutral bi-directional motors and improved commutation for the preferred direction of rotation for uni-directional motors. In FIGS. 2A and 2B, it is assumed that the armatures are rotating in the counter-clockwise direction as indicated by the arrows 20 and 20' and that the field poles (not specifically shown) are located on opposite sides of the armature intermediate the brush positions, as is conventional. FIG. 2A illustrates only the armature coil that is undergoing commutation by brush B1 and the two associated armature coils that are coupled to that coil, and FIG. 2B illustrates only the armature coil that is undergoing commutation by the brush B2 and the two associated armature coils that are coupled to this latter coil; it being understood that the commutation shown in FIGS. 2A and 2B is generally simultaneous in time. For reasons of clarity, the coils or windings shown in FIGS. 2A and 2B appear as single coils, although it is to be understood that the exemplary armature described below is of the type having two individual coils per slot. Commutation of the individual armature coils occurs in a sequential manner as the commutator bars pass beneath a brush. In the case of an armature winding having two coils per slot, the commutation sequence is as follows: the first coil in a slot set, the second coil in that slot set, the first coil in the next successive slot set, the second coil in the next successive slot set, etc. In the description of the commutation of the armature of FIG. 2A and 2B (a two coil per slot armature), the commutation of the second or last armature coil of a slot set is described in detail, it being understood that the commutation of the first armature coil in that slot set having preceded the commutation of the second coil.

Figure 3:
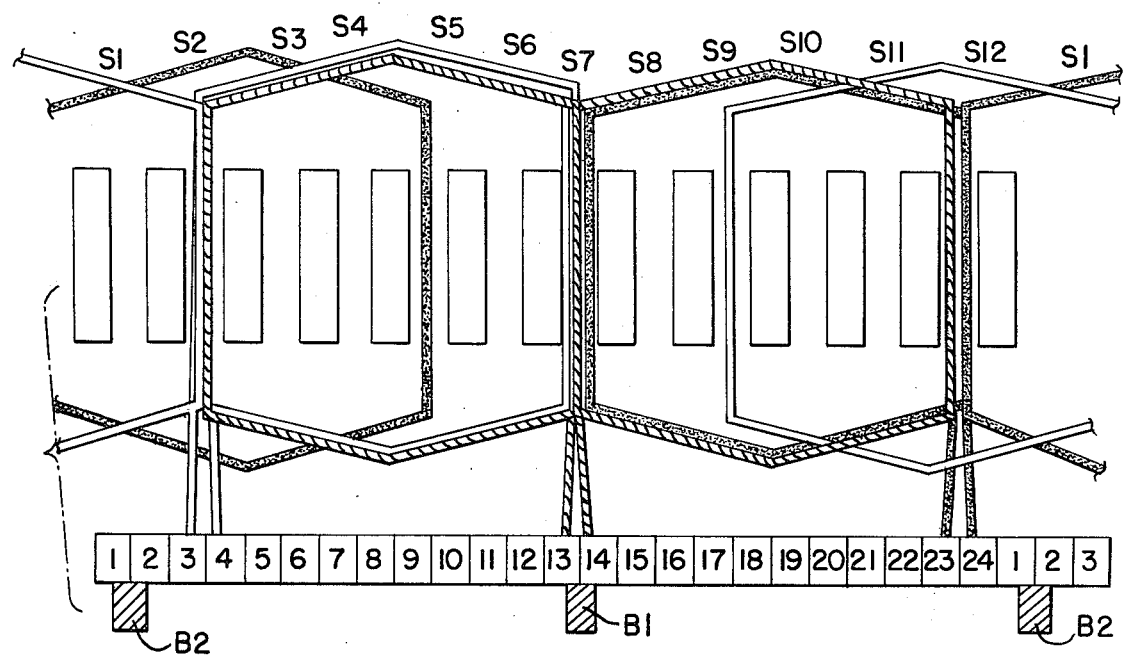
FIG. 3 is a conventional flat-developed view of the winding pattern shown in FIG. 2A in accordance with the present invention.

In FIG. 2A, the armature coils in slot set 2-7-12 (cross hatched) are shown connected to the commutator bars 12, and 13, and 13 and 14, respectively; the armature coils in slot set 7-2-9 (plain outline) connected to the commutator bars 2 and 3, and 3 and 4, respectively; and the armature coils in slot set 5-12-7 (stippled) connected to the commutator bars 22 and 23, and 23 and 24, respectively, with the coil in slot set 2-7-12 connected to the commutator bars 13 and 14 shown as undergoing commutation at the brush B1 during the time period that the brush B1 spans the adjacent commutator bars 13 and 14. The coil distribution of FIG. 2A is also shown in FIG. 3 in conventional flat development, it being understood that the illustrated connections to the commutator bars are the loop sides of conventional continuous lead loops with the end of each loop connected to its associated commutator bar by soldering or welding the loop end to a post or to the interior walls of a wire-receiving slot. As can be appreciated from an inspection of FIG. 2A, the coil half 2-7 of the armature coil 2-7-12 (cross-hatched undergoing commutation at the brush B1 shares coil sides in slots S2 and S7 with and is coupled to the coil half 7-2 of the armature coil 7-2-9 (plain outline) which is just about to undergo commutation by the brush B2, and the coil half 7-12 of the armature coil 2-7-12 undergoing commutation at the brush B1 shares coil sides in slots S7 and S12 with the coil half 12-7 of the armature coil 5-12-7 (stippled which winding has just completed commutation by the brush B2. Just prior to commutation by the brush B1 with the commutator rotating in the direction indicated by the arrow 20 in FIG. 2A, the current flow through the armature coil 2-7-12 will be in a first direction until the brush B1 spans the insulation between the commutator bars 13 and 14, which position is shown in FIG. 2A, at which time the coil winding 2-7-12 will be momentarily short circuited by the brush B1. The current in the now short circuited armature coil 2-7-12 will decrease in a generally non-linear manner as the magnetic field thereabout collapses. The current flow and its change will depend, in part, upon the magnitude of initial current flow through the armature coil 2-7-12 just prior to commutation (which initial current level is, in part, a function of the load experienced by the motor during the commutation process), the resistance of the coil wire, the inductive and capacitive reactances, the reluctance of the armature drum, and the position of the voltage cycle. With continued rotation of the armature, the brush B1 disconnects or breaks the connection between the commutator bars 13 and 14 to effect fully connection with the commutator bar 14 with the direction of the current flow through the coil 2-7-12 reversing from the direction just prior to its commutation.

As is known in the art, brush fire or brush sparking will occur during the commutation process depending upon the energy changes in the armature coil undergoing commutation. By arranging the coil half 2-7 and the coil half 7-12 of the armature coil 2-7-12 undergoing commutation at the brush B1 so that the coil sides of the coil half 2-7 shares slots S2 and S7 with the coil sides of the coil half 7-2 of the armature coil 7-2-9 (just about to undergo commutation of the brush B2) and by arranging the coil half 7-12 of the armature coil winding 2-7-12 undergoing commutation at brush B1 so that the coil sides of the coil half 7-12 shares slots S7 and S12 with the coil sides of the coil 12-7 of the armature coil 5-12-7 (just having completed commutation at the brush B2), it is believed that a portion of the energy in the armature coil 2-7-12 undergoing commutation at the brush B1 is transferred to the armature coil 7-2-9 just prior to this coil undergoing commutation at the brush B2 and/or to the armature coil 5-12-7 just after this latter coil has undergone commutation at the brush B2 with the result that less total energy is available in the armature coil 2-7-12 after undergoing commutation at the brush B1 for the generation of undesirable brush sparking and the resultant EMI. In addition to the energy transferred between the armature coils as just described, energy transfer may also occur, in the case of armatures having two or more coils per slot, between the armature coil undergoing commutation by a brush and the other coil or coils in the same slot sets as the coil undergoing commutation by that brush.

Substantially simultaneously with the commutation of the armature coil 2-7-12 at the brush B1 in FIG. 2A, the brush B2 is also placing an armature coil under commutation as illustrated in FIG. 2B. As shown therein, the armature coils in slot set 6-1-8 (cross hatched) are connected to the commutator bars 24 and 1 and 1 and 2, respectively; the armature coils in the slot set 1-6-11 (stippled) are connected to the commutator bars 10 and 11 and 11 and 12, respectively; and the armature coils in the slot set 3-8-1 (plain outline) are connected to the commutator bars 14 and 15 and 15 and 16, respectively, with the armature coil in the slot set 6-1-8 connected to the commutator bars 1 and 2 undergoing commutation at the brush B2 as shown. The coil sides of the coil half 6-1 share slots S6 and S1 with the coil sides of the coil half 1-6 of the armature coil 1-6-11 (stippled) and the coil sides of the coil half 1-8 of the armature coil 6-1-8 undergoing commutation at the brush B2 share slots S1 and S8 with the coil sides of the coil half 8-1 of the armature coil 3-8-1 (plain outline). The coil in slot set 1-6-11 connected to the commutator bars 11 and 12 just completes commutation by brush B1 while the coil 1-8-3 connected to the commutator bars 14 and 15 is just about to undergo commutation by the brush B1 as the coil 6-1-8 connected to the commutator bars 1 and 2 undergoes commutation by the brush B2. As in the case of the armature coils discussed above in connection with FIG. 2A, energy transfer is believed to take place between the coil winding 6-1-8 undergoing commutation at the brush B2 and the armature coil 1-8-3 about to undergo commuation by the other brush B1 and/or the armature coil 1-6-11 having just completed commutation by the other brush B1 so that the energy level in the armature coil 6-1-8 is diminished with a consequent diminishment of brush sparking and EMI. Additionally, it is believed that energy transfer takes place between the armature coil undergoing commutation in a slot set and the other coil or coils in that same slot set. It is believed that the energy transfer that takes place between the inter-distributed coils is through inductive and/or capacitive couplings therebetween.

The energy transfer that takes place between the interdistributed armature coils can also be conceptualized as follows: when an armature coil is undergoing commutation at one brush, that one brush momentarily short circuits or shunts the adjacent commutator bars for that armature coil. Shortly thereafter, the shunt connection "breaks" and at least part of the energy in that commutator armature coil will be transferred across the armature drum to slots on the opposite side of the armature drum from that one brush. This across-the-drum energy transfer is effected, in part, by energy transferred from the coil sides of the armature coil undergoing commutation by that one brush which coil sides are located in slots on the opposite side of the drum. This energy is transferred to an armature coil about to undergo commutation by the opposite brush and/or an armature coil having just completed commutation by the opposite brush. Shortly after these events take place, the armature coil that was about to undergo commutation by the opposite brush does, in fact, undergo such commutation with the energy in this armature coil now being transferred back across the armature drum to slots on the same side of the armature drum as the first-mentioned one brush. In effect, part of the energy in the armature coil windings can be visualized as being passed back and forth or exchanged in a reciprocating manner across the armature drum during rotation of the armature.

EXAMPLE I

Figure 4:
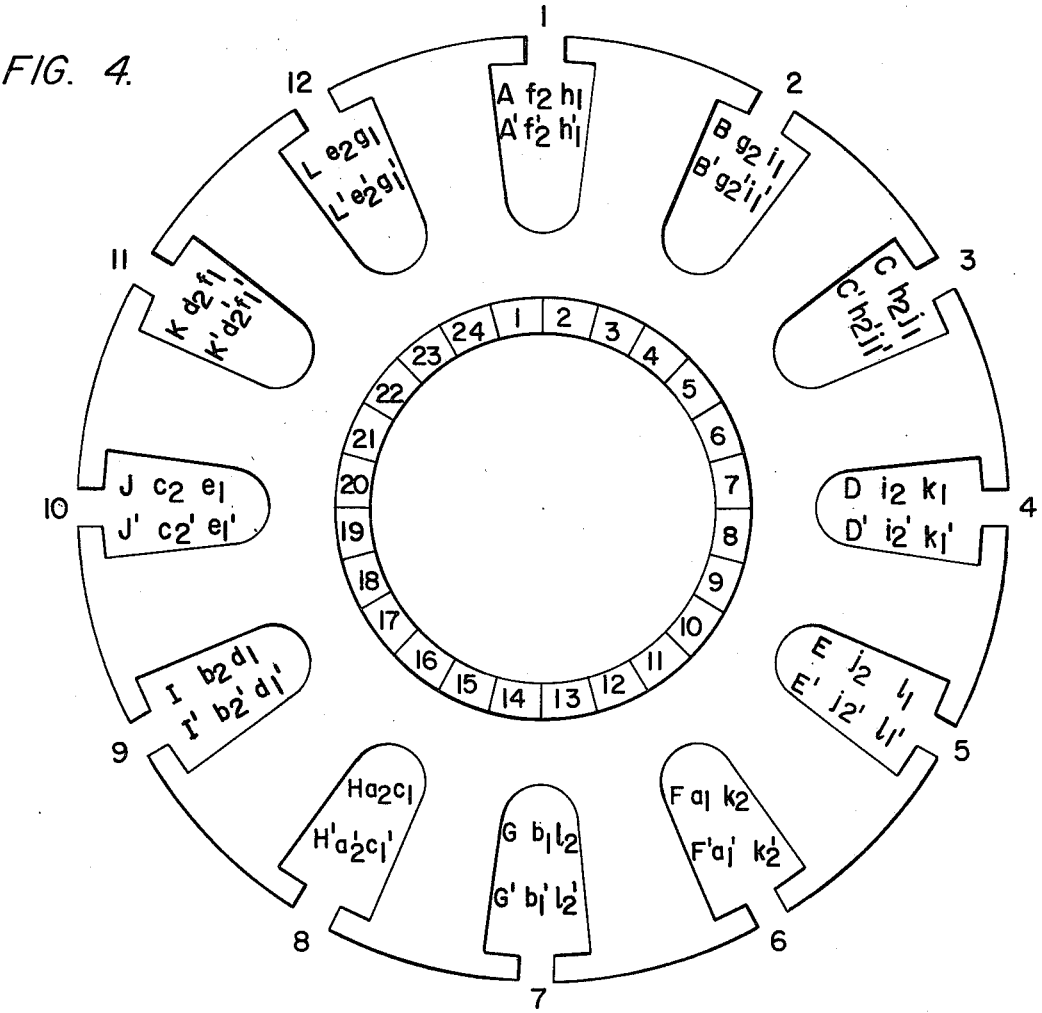
FIG. 4 is an end elevational view, in schematic form of a 12-slot, 24-bar, two coils per slot preferred embodiment of an armature rotor in accordance with the present invention.

A preferred embodiment of an armature in accordance with the present invention is schematically represented in FIG. 4 which illustrates a 12-slot, 24-bar, two coils per slot (24 coil) winding distribution in which the winding pitch (1/P) of the first coil half of each armature coil is 1/6 and the winding pitch for the second coil half of the coil is $\frac{1}{8}$ (1/P+2). In FIG. 4, the intermediate or central coil side of each armature coil is identified by an upper case letter while the coil sides of the first and second coil halves associated therewith have been identified with the same letter in lower case and with the subscripts 1 and 2. The second armature coil in the same slots are identified by the same upper and lower case designations as is the first armature coil in the slots but with a prime (') designation. Thus, the first armature coil winding A starts in slot 1 and is wound through slots 6 (that is with a 1/6 pitch) to define coil half A-a$_1$ and thereafter the coil half A-a$_2$ is wound through slots 1 and 8 (that is, a $\frac{1}{8}$ pitch). The second armature coil winding for those slots is then wound with the same slot distribution to define coil half A'-a'$_1$ between slots 1 and 6 and the coil half A'-a'$_2$ between the slots 1 and 8. In the same manner, each of the remaining armature coils are wound to define the distribution shown in FIG. 4. The winding distribution of the preferred embodiment illustrated in FIG. 4 is further defined in Table 1 and Table 1A below with Table 1 listing slots S1-12 on the left-hand side and the corresponding coil sides that occupy those slots on the right-hand side and Table 1A listing the commutator bar assignment for each of the armature coils A-L and A'-L'. Six additional examples, II through VII, of armature embodiments in accordance with the present invention are listed below in Tables 2 and 2A, 3 and 3A, 4 and 4A, 5 and 5A, 6 and 6A, and 7 and 7A. Examples II through VII define, respectively, a 12-slot, 12-bar, one coil/slot armature; a 13-slot, 26-bar, two coil/slot armature; a 14-slot, 42-bar, three coils/slot armature; a 14-slot, 28-bar, two coils/slot armature; a 14-slot, 14-bar, one coil/slot armature; and a 10-slot, 10-bar, one coil/slot armature. In the case of the fourth example, a double prime ('') is used to designate the third coil in each slot. These embodiments are not intended to be limiting, but are intended to merely demonstrate winding distributions on armature drums commonly used in domestic appliances and portable power tools.

EXAMPLE I

| TABLE 1 | | TABLE 1B | |
|---|---|---|---|
| Slot No. | Coil Sides | Coils | Commutator Bar (24) Assignment |
| 1 | A; f$_2$; h$_1$; A'; f$_2$'; h$_1$' | A | 1-2 |
|   |   | A' | 2-3 |
| 2 | B; g$_2$; i$_1$; B'; g$_2$'; i$_1$' | B | 3-4 |
|   |   | B' | 4-5 |
| 3 | C; h$_2$; j$_1$; C'; h$_2$'; j$_1$' | C | 5-6 |
|   |   | C' | 6-7 |
| 4 | D; i$_2$; k$_1$; D'; i$_2$'; k$_1$' | D | 7-8 |
|   |   | D' | 8-9 |
| 5 | E; j$_2$; l$_1$; E'; j$_2$'; l$_1$' | E | 9-10 |
|   |   | E' | 10-11 |
| 6 | F; a$_1$; k$_2$; F'; a$_1$'; k$_2$' | F | 11-12 |

-continued

| TABLE 1 | | TABLE 1B | |
|---|---|---|---|
| Slot No. | Coil Sides | Coils | Commutator Bar (24) Assignment |
| | | F' | 12-13 |
| 7 | G; $b_1$; $l_2$; G'; $b_1'$; $l_2'$ | G | 13-14 |
| | | G' | 14-15 |
| 8 | H; $a_2$; $c_1$; H'; $a_2'$; $c_1'$ | H | 15-16 |
| | | H' | 16-17 |
| 9 | I; $b_2$; $d_1$; I'; $b_2'$; $d_1'$ | I | 17-18 |
| | | I' | 18-19 |
| 10 | J; $c_2$; $e_1$; J'; $c_2'$; $e_1'$ | J | 19-20 |
| | | J' | 20-21 |
| 11 | K; $d_2$; $f_1$; K'; $d_2'$; $f_1'$ | K | 21-22 |
| | | K' | 22-23 |
| 12 | L; $e_2$; $g_1$; L'; $e_2'$; $g_1'$ | L | 23-24 |
| | | L' | 24-1 |

EXAMPLE II

| TABLE 2 | | TABLE 2A | |
|---|---|---|---|
| Slot No. | Coil Sides | Coils | Commutator Bar (12) Assignment |
| 1 | A; $f_2$; $h_1$ | A | 1-2 |
| 2 | B; $g_2$; $i_1$ | B | 2-3 |
| 3 | C; $h_2$; $j_1$ | C | 3-4 |
| 4 | D; $i_2$; $k_1$ | D | 4-5 |
| 5 | E; $j_2$; $l_1$ | E | 5-6 |
| 6 | F; $a_1$; $k_2$ | F | 6-7 |
| 7 | G; $b_1$; $l_2$ | G | 7-8 |
| 8 | H; $a_2$; $c_1$ | H | 8-9 |
| 9 | I; $b_2$; $d_1$ | I | 9-10 |
| 10 | J; $c_2$; $e_1$ | J | 10-11 |
| 11 | K; $d_2$; $f_1$ | K | 11-12 |
| 12 | L; $e_2$; $g_1$ | L | 12-1 |

EXAMPLE III

| TABLE 3 | | TABLE 3A | |
|---|---|---|---|
| Slot No. | Coil Sides | Coils | Commutator Bar (26) Assignment |
| 1 | A; $h_1$; $g_2$; A'; $h_1'$; $g_2'$ | A | 1-2 |
| | | A' | 2-3 |
| 2 | B; $h_2$; $i_1$; B'; $h_2'$; $i_2'$ | B | 3-4 |
| | | B' | 4-5 |
| 3 | C; $j_1$; $i_2$; C'; $j_1'$; $i_2'$ | C | 5-6 |
| | | C' | 6-7 |
| 4 | D; $j_2$; $k_1$; D'$j_2'$; $k_1'$ | D | 7-8 |
| | | D' | 8-9 |
| 5 | E; $k_2$; $l_1$; E'; $k_2'$; $l_1'$ | E | 9-10 |
| | | E' | 10-11 |
| 6 | F; $l_2$; $m_1$; F'$l_2$; $m_1'$ | F | 11-12 |
| | | F' | 12-13 |
| 7 | G; $m_2$; $a_1$; G'; $m_2'$; $a_1'$ | G | 13-14 |
| | | G' | 14-15 |
| 8 | H; $a_2$; $b_1$; H'; $a_2'$; $b_1'$ | H | 15-16 |
| | | H' | 16-17 |
| 9 | I; $b_2$; $C_1$; I'; $b_2'$; $C_1'$ | I | 17-18 |
| | | I' | 18-19 |
| 10 | J; $C_2$; $d_1$; J'; $C_2'$; $d_1'$ | J | 19-20 |
| | | J' | 20-21 |
| 11 | K; $d_2$; $e_1$; K'; $d_2'$; $e_1'$ | K | 21-22 |
| | | K' | 22-23 |
| 12 | L; $e_2$; $f_1$; L'; $e_1'$; $f_1$ | L | 23-24 |
| | | L' | 24-25 |
| 13 | M; $f_2$; $g_1$; M'; $f_2'$; $g_1'$ | M | 25-26 |
| | | M' | 26-1 |

EXAMPLE IV

| TABLE 4 | | TABLE 4A | |
|---|---|---|---|
| Slot No. | Coil Sides | Coils | Commutator Bar (42) Assignment |
| 1 | A; $g_2$; $i_1$; A'; $g_2'$; $i_1'$; A''; $g_2''$; $i_1''$ | A | 1-2 |
| | | A' | 2-3 |
| | | A'' | 3-4 |
| 2 | B; $h_2$; $j_1$; B'; $h_2'$; $j_1'$; B''; $h_2''$; $j_1''$ | B | 4-5 |
| | | B' | 5-6 |
| | | B'' | 6-7 |
| 3 | C; $i_2$; $k_1$; C'; $i_2'$; $k_1'$; C''; $i_2''$; $k_1''$ | C | 7-8 |
| | | C' | 8-9 |
| | | C'' | 9-10 |
| 4 | D; $j_2$; $l_1$; D'; $j_2'$; $l_1'$; D''; $j_2''$; $l_1''$ | D | 10-11 |
| | | D' | 11-12 |
| | | D'' | 12-13 |
| 5 | E; $k_2$; $m_1$; E'; $k_2'$; $m_1'$; E''; $k_2''$; $m_1''$ | E | 13-14 |
| | | E' | 14-15 |
| | | E'' | 15-16 |
| 6 | F; $l_2$; $n_1$; F'; $l_2'$; $n_1'$; F''; $l_2''$; $n_1''$ | F | 16-17 |
| | | F' | 17-18 |
| | | F'' | 18-19 |
| 7 | G; $a_1$; $m_2$; G'; $a_1'$; $m_2'$; G''; $a_1''$; $m_2''$ | G | 19-20 |
| | | G' | 20-21 |
| | | G'' | 21-22 |
| 8 | H; $b_1$; $n_2$; H'; $b_1'$; $n_2'$; H''; $b_1''$; $n_2''$ | H | 22-23 |
| | | H' | 23-24 |
| | | H'' | 24-25 |
| 9 | I; $a_2$; $c_1$; I'; $a_2'$; $c_1'$; I''; $a_2''$; $c_1''$ | I | 25-26 |
| | | I' | 26-27 |
| | | I'' | 27-28 |
| 10 | J; $b_2$; $d_1$; J'; $b_2'$; $d_1'$; J''; $b_2''$; $d_1''$ | J | 28-29 |
| | | J' | 29-30 |
| | | J'' | 30-31 |
| 11 | K; $c_2$; $e_1$; K'; $c_2'$; $e_1'$; K''; $c_2''$; $e_1''$ | K | 31-32 |
| | | K' | 32-33 |
| | | K'' | 33-34 |
| 12 | L; $d_2$; $f_1$; L'; $d_2'$; $f_1'$; L''; $d_2''$; $f_1''$ | L | 34-35 |
| | | L' | 35-36 |
| | | L'' | 36-37 |
| 13 | M; $e_2$; $g_1$; M'; $e_2'$; $g_1'$; M''; $e_2'''$ $g_1''$ | M | 37-38 |
| | | M' | 38-39 |
| | | M'' | 39-40 |
| 14 | N; $f_2$; $h_1$; N'; $f_2''$ $h_1'$; N'''; $f_2'''$ $h_1''$ | N | 40-41 |
| | | N' | 41-42 |
| | | N'' | 42-1 |

EXAMPLE V

| TABLE 5 | | TABLE 5A | |
|---|---|---|---|
| Slot No. | Coil Sides | Coils | Commutator Bar Assignment |
| 1 | A; $g_2$; $i_1$; A'; $g_2'$; $i_1'$ | A | 1-2 |
| | | A' | 2-3 |
| 2 | B; $h_2$; $j_1$; B'; $h_2'$; $j_1'$ | B | 3-4 |
| | | B' | 4-5 |
| 3 | C; $i_2$; $k_1$; C'; $i_2'$; $k_1'$ | C | 5-6 |
| | | C' | 6-7 |
| 4 | D; $j_2$; $l_1$; D'; $j_2'$; $l_1'$ | D | 7-8 |
| | | D' | 8-9 |
| 5 | E; $k_2$; $m_1$; E'; $k_2'$; $m_1'$ | E | 9-10 |
| | | E' | 10-11 |
| 6 | F; $l_2$; $n_1$; F'; $l_2'$; $n_1'$ | F | 11-12 |
| | | F' | 12-13 |
| 7 | G; $a_1$; $m_2$; G'; $a_1'$; $m_2'$ | G | 13-14 |
| | | G' | 14-15 |
| 8 | H; $b_1$; $n_2$; H'; $b_1'$; $n_2'$ | H | 15-16 |
| | | H' | 16-17 |
| 9 | I; $a_2$; $c_1$; I'; $a_2'$; $c_1'$ | I | 17-18 |
| | | I' | 18-19 |
| 10 | J; $b_2$; $d_1$; J'; $b_2'$; $d_1'$ | J | 19-20 |
| | | J' | 20-21 |
| 11 | K; $c_2$; $e_1$; K'; $c_2'$; $e_1'$ | K | 21-22 |
| | | K' | 22-23 |
| 12 | L; $d_2$; $f_1$; L'; $d_2'$; $f_1'$ | L | 23-24 |
| | | L' | 24-25 |

| TABLE 5 | | TABLE 5A | |
|---|---|---|---|
| Slot No. | Coil Sides | Coils | Commutator Bar Assignment |
| | -continued | | |
| 13 | M; $e_2$; $g_1$; M'; $e_2'$; $g_1'$ | M | 25–26 |
| | | M' | 26–27 |
| 14 | N; $f_2$; $h_1$; N'; $f_2'$; $f_1'$ | N | 27–28 |
| | | N' | 28–1 |

EXAMPLE VI

| Table 6 | | Table 6A | |
|---|---|---|---|
| Slot No. | Coil Sides | Coils | Commutator Bar (14) Assignment |
| 1 | A; $g_2$; $i_1$ | A | 1–2 |
| 2 | B; $h_2$; $j_1$ | B | 2–3 |
| 3 | C; $i_2$; $k_1$ | C | 3–4 |
| 4 | D; $j_2$; $l_1$ | D | 4–5 |
| 5 | E; $k_2$; $m_1$ | E | 5–6 |
| 6 | F; $l_2$; $n_1$ | F | 6–7 |
| 7 | G; $a_1$; $m_2$ | G | 7–8 |
| 8 | H; $b_1$; $n_2$ | H | 8–9 |
| 9 | I; $a_2$; $c_1$ | I | 9–10 |
| 10 | J; $b_2$; $d_1$ | J | 10–11 |
| 11 | K; $c_2$; $e_1$ | K | 11–12 |
| 12 | L; $d_2$; $f_1$ | L | 12–13 |
| 13 | M; $e_2$; $g_1$ | M | 13–14 |
| 14 | N; $f_2$; $h_1$ | N | 14–1 |

EXAMPLE VII

| Table 7 | | Table 7A | |
|---|---|---|---|
| Slot No. | Coil Sides | Coils | Commutator Bar (10) Assignment |
| 1 | A; $e_2$; $g_1$ | A | 1–2 |
| 2 | B; $f_2$; $h_1$ | B | 2–3 |
| 3 | C; $g_2$; $i_1$ | C | 3–4 |
| 4 | D; $h_2$; $j_1$ | D | 4–5 |
| 5 | E; $a_1$; $i_2$ | E | 5–6 |
| 6 | F; $b_1$; $j_2$ | F | 6–7 |
| 7 | G; $a_2$; $c_1$ | G | 7–8 |
| 8 | H; $b_2$; $d_1$ | H | 8–9 |
| 9 | I; $c_2$; $e_1$ | I | 9–10 |
| 10 | J; $d_2$; $f_1$ | J | 10–1 |

Figure 5:
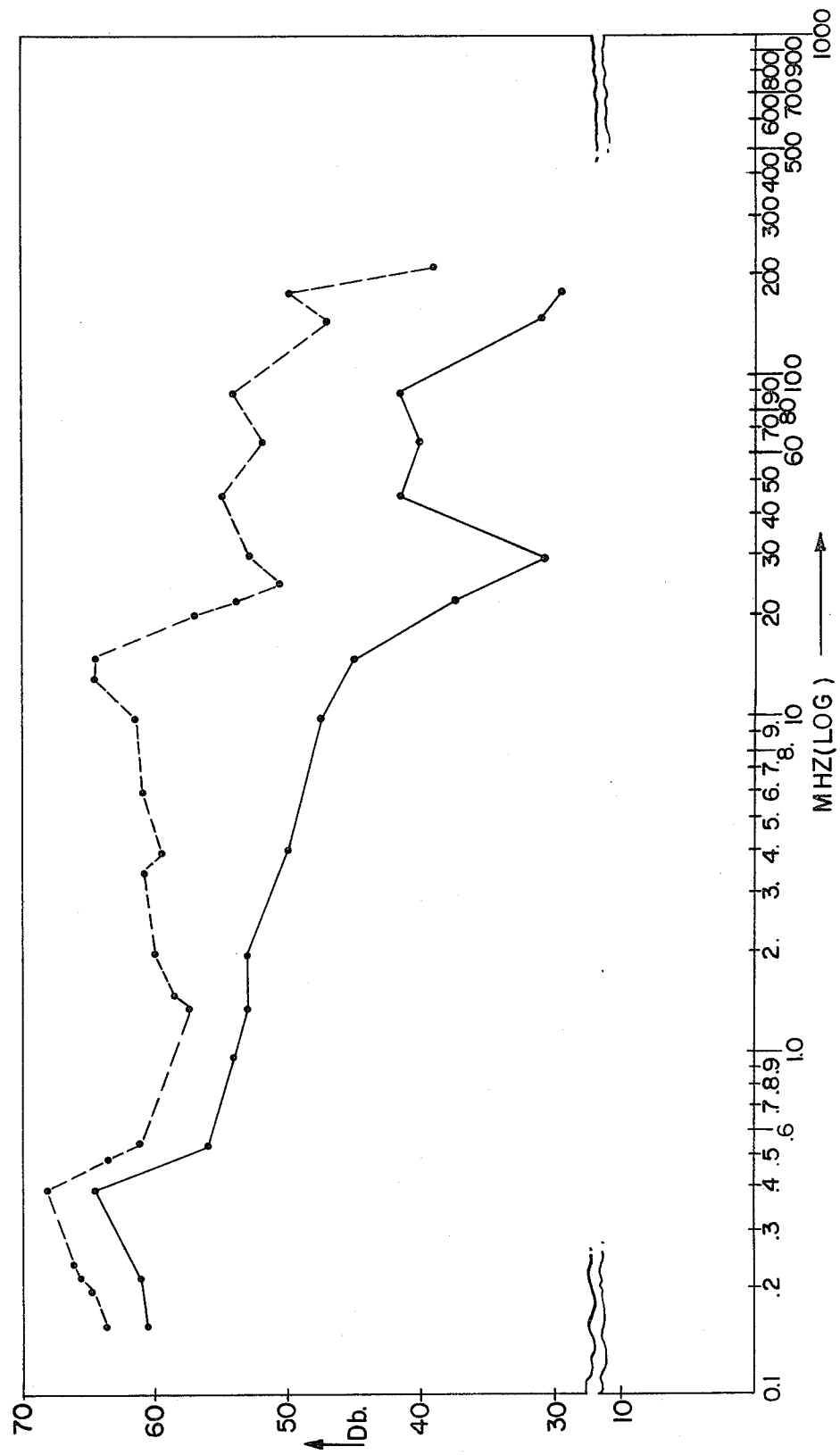
FIG. 5 is a comparative graphical representation of the EMI generated during the operation of a conventional electric motor having a lap winding (dashed line) and a motor of the same type having an armature wound in accordance with the present invention (solid line).

An appreciation of the EMI reduction aspect of an armature wound in accordance with the present invention may be had by consideration of the test results shown in FIG. 5 in which the EMI signal levels generated by two test armatures are graphically illustrated, one of the armatures being wound in a conventional manner and the other being wound in accordance with the present invention. In the graph of FIG. 5, the ordinate represents the EMI signal level in decibels (Db) and the abscissa represents frequency in Megahertz (Mhz) with the frequency plotted logarithmically from 0.1 Megahertz to 1000 Megahertz and with the test being conducted in accordance with the aforementioned C.I.S.P.R. Publication 14 "Limits and Methods of Measurement of Radio Interference Characteristics of Household Electrical Appliances, Portable Tools and Similar Electrical Apparatus" for motors drawing less than 700 watts.

The conventional motor tested was a 14-slot, 28-bar, two coils per slot universal motor (two pole) in which the coil windings were conventionally distributed to define a lap armature winding, which motor is commonly used in portable power tools in combination with standard EMI suppression components. The EMI performance of this motor is plotted in broken line illustration in FIG. 5. The test armature was also a 14-slot, 28-bar, two coils per slot armature but wound in accordance with the present invention (in combination with the same standard suppression components as the conventional motor). The EMI performance of this test motor is shown in solid line illustration in FIG. 5. As can be appreciated from an inspection of the graphical results, the test motor in accordance with the present invention has an EMI output that is generally lower than the standard motor below two Megahertz with the difference between the two plots increasing up until 30 Megahertz at which point the EMI output for both motors rises somewhat until 100 Megahertz and thereafter drops. As can be appreciated, the armature winding in accordance with the present invention provides a substantial decrease in EMI output when compared to the prior, standard motor design.

It has also been found that the winding distribution of the present invention provides practical advantages when designing so-called neutral armature motors for bi-directional applications, such as reversible portable power tools. In providing a motor for bi-directional applications, the conventional practice is to align the brushes along the neutral axis and connect the armature coil leads to their associated commutator bars to provide a so-called neutral armature. These types of motors generate greater than normal brush sparking when compared to the motors that have a preferred direction of rotation in which the previously described brush shift has been effected. It has been the common practice in the industry to increase the field turns ratio for bi-directional motors in an attempt to reduce the brush sparking to an acceptable level. As a consequence, motors of this type have suffered from reduced power output, and to some extent, larger frame size. It has been found that in bi-directional motors having armatures wound in accordance with the present invention, the brush sparking is sufficiently reduced so that the practice of increasing the field turns ratio can be eliminated to provide a smaller, more powerful motor that is nonetheless well suited for bi-directional motor applications.

The wire turns of the armature coils may be applied to the armature drum in either of two manners. For example, the first coil half of an armature coil may be wound and then thereafter the second half of that coil may be wound, or, in the alternative, the wire turns of the armature coil may be alternately wound between the slots that define the first and second coil halves. For example, the first wire-turn may be wound in those slots that define the first coil half, a second wire-turn then wound in the slots that define the second coil half, a third wire-turn then wound in the first coil half slots, etc. with this procedure followed until the entire armature coil is in place.

When winding an armature stack using the so-called flying arm winding type machines in which a movable arm having a wire dispensing end is orbited about the stack to lay the wire into the various slots, an armature may be wound in accordance with the present invention by winding the first coil half, e.g., between slots 1 and 6 (in a 12-slot stack) and then indexing the armature to a new position in which the eighth slot occupies the position formerly occupied by the first slot, reversing the direction of the flyer, and then winding the second coil half between slots 8 and 1. In those applications in which two coils are wound per slot, the armature can then be indexed back to its original position and any conventional lead connection procedure followed to connect the coil lead to its associated commutator bar. Then the winding procedure can be sequentially followed to place the second armature coil in the same slots as the first armature coil, and the coil lead connection to its commutator bar again effected. Of course, the same procedure set forth above may be used on winding machines having double flying arms, on winding machines which tumble the armature with or without indexing when winding the coil halves, as well as other types of winding machines.

In the armature embodiments described above, including the even slot embodiments of Examples I, II, and IV to VII and the odd slot embodiment of Example III, the pitch of the coil halves as measured in terms of slot pitches (that is, the number of slots that a coil half extends) conforms to the following relationship: Eq. (1)

$$\text{Pitch (in slot pitches)} = \frac{\text{total number of slots}}{2} - n$$

where n for armatures having an even number of slots is selected from the series 1, 2, 3 ..., and where n for armatures having an odd number of slots is selected from the series $\frac{1}{2}$, 3/2, 5/2, ... For example, the coil half pitch for the even, 14-slot armature drums of the embodiments of Examples IV, V, and VI is 6-slot pitches where n is selected as 1 (14/2-1=6). Thus, the coil half A-a$_1$ for these embodiments extends 6-slot pitches between slots S1 and S7 and the coil half A-a$_2$ extends 6-slot pitches between slots S1 and S9. Likewise, the coil half pitch for the odd, 13-slot embodiment of Example III is 6-slot pitches where n is selected as $\frac{1}{2}$ (13/2-$\frac{1}{2}$=6). Thus, the coil half A-a$_1$ for this latter embodiment extends 6-slot pitches between slots S1 and S7 and the coil half A-a$_2$ also extends 6-slot pitches between slots S1 and S8. While the present invention has been disclosed in the context of armature drums having slots substantially parallel to the armature axis of rotation, the invention is equally suited to armatures having skewed slots.

As can be appreciated by those skilled in the art, various changes and modifications may be made to the disclosed embodiments of the present invention without departing from the spirit and scope of the present invention as defined in the appended claims and their legal equivalent.

What is claimed is:

1. An electric motor of the commutator brushtype, said electric motor comprising:
   an armature core mounted for rotation about an axis, said armature core having a plurality of slots distributed thereabout;
   a commutator defined by a plurality of commutator bars connected to said armature core for rotation therewith;
   means for establishing a field for said armature core;
   first and second brushes supported for contact with said commutator to effect commutation; and
   a plurality of armature coils located in said slots, said coils connected to said commutator bars to define an armature circuit, each of said armature coils divided into first and second sub-coils, each sub-coil having first and second coil sides, the sub-coils of each armature coil distributed in said slots so that one of the coil sides of each of said first and second sub-coils of an armature coil shares a common slot and further distributed so that the other coil side of a first sub-coil of an armature coil undergoing commutation by one of said brushes shares a slot with a coil side of a sub-coil of another armature coil about to undergo commutation by the other brush and so that the other coil side of the second sub-coil of said armature coil undergoing commutation by said first-mentioned brush shares a slot with a coil side of a sub-coil of still another armature coil having completed commutation by the other of said brushes.

2. An improved electric motor of the type having an armature that includes a commutator connected thereto for rotation therewith about an axis within a field, the armature having a plurality of armature coils thereon connected to commutator bars of said commutator to define an armature circuit and at least two brushes for contacting said commutator to effect commutation, the improvement comprising:
   the armature coils each divided into first and second sub-coils each having first and second coil sides and distributed about the armature so that one of the coil sides of each of said first and second sub-coils share a common slot and further distributed so that the other coil-sides of the first and second sub-coils of an armature coil undergoing commutation by one of said brushes share, respectively, a common slot with a coil side of a sub-coil of an armature coil having just completed commutation by the other brush and a common slot with a coil side of a sub-coil of another armature coil just about to undergo commutation by the other brush.

3. An electric motor of the commutator brush-type, said electric motor comprising:
   an armature mounted for rotation about an axis in a field, said armature having a plurality of slots distributed thereabout;
   a commutator defined by a plurality of commutator bars, said commutator connected to said armature for rotation therewith;
   brushes for contacting said commutator to effect commutation; and
   a plurality of armature coils distributed in said slots of said armature, said coils connected to said commutator bars to define an armature circuit;
   said armature coils divided into first and second sub-coils each having first and second coil sides, the first and second sub-coil of each armature coil wound so that one of the coil sides of each sub-coil of an armature coil share a common slot and further wound at a pitch equal to the (total number of slots÷2)−n, where n=1, 2, 3, ... for armatures having an even number of slots and where n=$\frac{1}{2}$, 3/2, 5/2, ... for armatures having an odd number of slots, the armature coils connected to said commutator bars so that when one of the armature coils is under commutation by one of the brushes, the other coil sides of the first and second sub-coils thereof share a common slot with, respectively, a coil side of a coil about to undergo commutation by the other of said brushes and a coil side of a coil having just completed commutation by the other of said brushes.

4. An improved commutator brush electric motor of the type that includes an armature having a commutator connected thereto for rotation therewith about an axis in a field, the armature having a plurality of armature coils thereon connected to commutator bars of said commutator to define an armature circuit and brushes for contacting said commutator to effect commutation, said improvement comprising:

each of said armature coils divided into first and second sub-coils each having first and second coil sides, one of the coil sides of each sub-coil of an armature coil sharing a common slot, the first and second sub-coil of each armature coil having a pitch equal to the (total number of slots÷2)−n, where n=1, 2, 3, . . . for armatures having an even number of slots and were n=½, 3/2, 5/2, . . . for armatures having an odd number of slots, the armature coils connected to said commutator bars so that when one of the armature coils is under commutation by one of said brushes, the other coil sides of the first and second sub-coils of said one armature coil share, respectively, a common slot with a coil side of a sub-coil of another armature coil having completed commutation by the other of said brushes and a common slot with a coil side of a sub-coil of still another armature coil about to undergo commutation by the other of said brushes.

5. An armature for an electric motor, said armature comprising:

an armature core having a plurality of slots distributed thereabout for receiving armature coils;

a commutator defined by a plurality of commutator bars connected to said core for rotation therewith; and a plurality of armature coils located in said slots, said armature coils connected to said commutator bars to define an armature circuit;

each of said armature coils divided into first and second coil halves, each of said halves having first and second coil sides, the coil halves of each armature coil distributed in said slots such that one of the coil sides of each of said coil-halves share a common slot and such that an armature coil, when under commutation by a first commutation means, will have the other coil side of one of its coil halves sharing a slot with a coil side of a coil half of an armature coil having completed commutation by another commutation means and will have the other coil side of the other of its coil halves sharing slots with a coil side of a coil half of another armature coil about to undergo commutation by said other commutation means.

6. An improved armature for an electric motor, said armature of the type having an armature core with a plurality of slots formed therein and a commutator defined by a plurality of commutator bars connected thereto for rotation about a common axis, said commutator adapted to be contacted by first and second brushes to effect commutation thereof, the improvement comprising:

a plurality of armature coils located in said slots, said armature coils connected to said commutator bars to define an armature circuit, each of said armature coils divided into first and second sub-coils each having first and second coil sides, said armature coils located in said slots so that one of the coil sides of each sub-coil of an armature coil share a common slot, the other coil side of a first sub-coil of an armature coil undergoing commutation by one of said brushes sharing a common slot with a coil side of a sub-coil of another armature coil just about to undergo commutation by the other of said brushes and the other coil side of the second sub-coil of said armature coil undergoing commutation by the first of said brushes sharing a common slot with the coil side of a sub-coil of another armature coil having just completed commutation by the other of said brushes.

7. An armature for an electric motor, said armature comprising:

an armature core having a plurality of slots thereabout for receiving armature coils;

a commutator defined by a plurality of commutator bars connected to said core for rotation therewith about an axis, said commutator adapted to be contacted by at least first and second brushes to effect commutation; and a plurality of armature coils in said slots and connected to said commutator bars to define an armature circuit, said armature coils divided into first and second coil sub-sections each having first and second coil sides, the first and second sub-section of each armature coil wound so that one of the coil sides of each of said first and second sub-sections of an armature coil shares a common slot and further wound at a pitch equal to the (total number of slots÷2)−n, where n=1, 2, 3, . . . for armatures having an even number of slots and were n=½, 3/2, 5/2, . . . for armatures having an odd number of slots, the armature coils connected to said commutator bars so that when one of said armature coils is undergoing commutation by one of said brushes, the other coil side of the first sub-section of that coil shares a common slot with a coil side of an armature coil about to undergo commutation by the other of said brushes and the other coil side of the second sub-section of said armature coil undergoing commutation by the first of said brushes shares a common slot with a coil side of another armature coil having just completed commutation by the other of said brushes.

8. An improved armature for an electric motor, said armature of the type having an armature core that includes a plurality of slots distributed thereabout for receiving armature coils and a commutator defined by a plurality of commutator bars connected to said core for rotation therewith about an axis, said commutator adapted to be contacted by first and second brushes to effect commutation, and a plurality of armature coils in said slots and connected to said commutator bars to effect an armature circuit, the improvement comprising:

each armature coil divided into first and second sub-coils each having first and second coil sides, the first and second sub-coil of each armature coil wound so that one of the coil sides of each sub-coil thereof share a common slot and further wound at a pitch equal to the (total number of slots÷2)−n, where n=1, 2, 3, . . . for armatures having an even number of slots and where n=½, 3/2, 5/2, . . . for armatures having an odd number of slots, the armature coils connected to the commutator so that when one of the armature coils is undergoing commutation by one of the brushes, the other coil side of one of the sub-coils thereof shares a common slot with a coil side of a sub-coil of another armature coil about to undergo commutation by the other of the brushes and the other coil side of the other of the sub-coils of the armature coil undergoing commutation by the first brush shares a common slot with a coil side of a sub-coil of another armature coil having just completed commutation by the other of said brushes.

9. An armature for an electric motor, said armature comprising:
an armature drum having fourteen slots distributed thereabout and a fourteen bar commutator connected thereto for rotation therewith about an axis; and
an armature coil for each of said slots, each of said armature coils divided into first and second sub coils each having first and second coil sides, said armature coils wound so that one of the coil sides of each sub-coil thereof share a common slot and further wound so that the first sub-coil of each armature coil is wound on a pitch equal to 1-6 and a second sub-coil of each armature coil is wound on a pitch equal to 1-8, the armature coils connected to adjacent commutator bars in sequence to define a commutator circuit.

10. The armature claimed in claim 9 wherein there are two armature coils per slot and said commutator is a twenty-eight bar commutator with said armature coils successively connected to adjacent commutator bars in sequence to define the commutator circuit.

11. The armature claimed in claim 9 wherein there are three armature coils per slot and said commutator is a forty-two bar commutator with said armature coils successively connected to adjacent commutator bars in sequence to define the commutator circuit.

12. An armature for an electric motor, said armature comprising:
an armature drum having thirteen slots distributed thereabout and a thirteen bar commutator connected thereto for rotation therewith about an axis; and
an armature coil for each of said slots, each of said armature coils divided into first and second sub-coils each having first and second coil sides, said armature coils wound so that one of the coil sides of each sub-coil thereof share a common slot and further wound so that the first sub-coil of each armature coil is wound on a pitch equal to 1-7 and a second sub-coil of each armature coil is wound on a pitch equal to 1-8, the armature coils connected to adjacent commutator bars in sequence to define a commutator circuit.

13. The armature claimed in claim 12, wherein there are two armature coils per slot and said commutator is a twenty-six bar commutator with said armature coils successively connected to adjacent commutator bars in sequence to define the commutator circuit.

14. An armature for an electric motor, said armature comprising:
an armature drum having twelve slots distributed thereabout with a twelve bar commutator connected thereto for rotation therewith about an axis; and
an armature coil for each of said slots, each of said armature coils divided into first and second sub-coils each having first and second coils sides, said armature coils wound so that one of the coil sides of each sub-coil thereof shares a common slot and further wound so that said first sub-coil of each armature coil is wound at a 1-5 pitch and said second sub-coil of that armature coil is wound at 1-7 pitch, said armature coils connected to adjacent commutator bars in sequence to define an armature circuit.

15. The armature claimed in claim 14, wherein there are two coils per slot and said commutator is a twenty-four bar commutator with said armature coils connected to adjacent commutator bars in sequence to define said commutator circuit.

16. An armature for an electric motor, said armature comprising:
an armature drum having ten slots distributed thereabout with a ten-bar commutator connected thereto for rotation therewith; and
an armature coil for each of said slots, each of said armature coils divided into first and second sub-coils each having first and second coil sides, said armature coils wound so that one of the coil sides of each sub-coil thereof share a common slot and further wound so that the first sub-coil of each armature coil is wound on a 1-4 pitch and the second sub-coil of that armature coil is wound on a 1-16 pitch, each armature coil connected to adjacent commutator bars in sequence to define a commutator circuit.

17. An electric motor of the commutator brush-type, said electric motor comprising:
an armature core mounted for rotation about an axis, said armature core having a plurality of slots distributed thereabout;
a commutator defined by a plurality of commutator bars connected to said armature core for rotation therewith;
means for establishing a field for said armature core;
first and second brushes supported for contact with said commutator to effect commutation; and
a plurality of armature coils located in said slots, said coils connected to said commutator bars to define an armature circuit, each of said armature coils divided into first and second sub-coils each having first and second coil sides, the sub-coils of each armature coil distributed in said slots so that one of the coil sides of each of said first and second sub-coils of an armature coil share a common slot and so that the other coil side of a first sub-coil of an armature coil undergoing commutation by one of said brushes shares a common slot with a coil side of a sub-coil of another armature coil about to undergo commutation by the other brush, and the other coil side of the second sub-coil of said armature coil undergoing commutation by said one brush shares a common slot with a coil side of a sub-coil of another armature coil having completed commutation by said other brush, and so that the other coil side of a sub-coil of an armature coil undergoing commutation by said other brush shares a common slot with a coil side of a sub-coil of an armature coil about to undergo commutation by said one brush, and the other coil side of a second sub-coil of said armature coil undergoing commutation by said other brush shares a common slot with a coil side of a sub-coil of an armature coil just having completed commutation by said one brush.

18. The electric motor claimed in claim 17, wherein the commutation of said armature coils by said one brush and said other brush is substantially simultaneous.

19. An electric motor of the commutator brush-type, said electric motor comprising:
an armature mounted for rotation about an axis, said armature having a plurality of slots distributed thereabout;

a commutator defined by a plurality of commutator bars, said commutator connected to said armature for rotation therewith;

brushes for contacting said commutator to effect commutation;

a plurality of armature coils distributed in said slots of said armature, said coils connected to said commutator bars to define an armature circuit; and means defining a field for said armature;

said armature coils divided into first and second sub-coils each having first and second coil sides, the first and second sub-coil of each armature coil wound so that one of the coil sides of each of said sub-coils of an armature coil share a common slot and further wound at a pitch equal to the (total number of slots÷2)−n, where n=1, 2, 3, ... for an armature having an even number of slots and when n=½, 3/2, 5/2, ... for an armature having an odd number of slots, the armature coils connected to said commutator bars so that the other coil side of a first sub-coil of the armature coil undergoing commutation by one of said brushes shares a common slot with a coil side of a sub-coil of another armature coil about to undergo commutation by the other of said brushes, and the other coil side of the second sub-coil of said armature coil undergoing commutation by said one brush share a common slot with a coil side of a sub-coil of another armature coil having just completed commutation by said other brush; and the other coil side of a first sub-coil of an armature coil undergoing commutation by said other brush shares a common slot with a coil side of a sub-coil of an armature coil about to undergo commutation by said one brush, and the other coil side of a second sub-coil of said armature coil undergoing commutation by said other brush shares a common slot with a coil side of a sub-coil of an armature coil having just completed commutation by said one brush.

20. The electric motor claimed in claim 19, wherein the commutation of said armature coil by said one brush and said other brush is substantially simultaneous.

21. An electric motor of the commutator brush-type, said electric motor comprising:

an armature core mounted for rotation about an axis, said armature coil having a plurality of slots distributed thereabout;

a commutator defined by a plurality of commutator bars connected to said armature core for rotation therewith;

means for establishing a field for said armature coil;

first and second brushes supported for contact with said commutator to effect commutation; and a plurality of armature coils located in said slots, said coils connected to said commutator bars to define an armature circuit, each of said armature coils divided into first and second sub-coils each having first and second coil sides, the sub-coils of each armature coil distributed in said slots so that one of the first and second coil sides of the first and second sub-coils of an armature coil share a common slot and so that the other coil side of a first sub-coil of an armature coil undergoing commutation by one of said brushes shares a common slot with a coil side of a sub-coil of another armature coil about to undergo commutation by the other of said brushes and the other coil side of the second sub-coil of said armature coil undergoing commutation by the first-mentioned brush shares a common slot with a coil side of a sub-coil of still another armature coil having completed commutation by the other of said brushes, at least some energy in said armature coil undergoing commutation by said first brush being transferred across said armature coil to the side thereof opposite from said first-mentioned brush by virtue of the energy transferred from the sub-coils of said armature coil undergoing commutation by said first brush to the sub-coils of the armature coils about to undergo and having just completed commutation by said other brush.

22. An electric motor of the commutator brush-type, said electric motor comprising:

an armature mounted for rotation about an axis, said armature having a plurality of slots distributed thereabout;

a commutator defined by a plurality of commutator bars, said commutator connected to said armature for rotation therewith;

brushes for contacting said commutator to effect commutation thereof;

a plurality of armature coils in said slots of said armature, said coils connected to said commutator bars to define an armature circuit; and means defining a field for said armature;

said armature coils divided into first and second sub-coils each having first and second coil sides, the first and second sub-coils of each armature coil wound so that one of the coil sides of each of said sub-coils of an armature coil share a common slot and further wound at a pitch equal to the (total number of slots÷2)−n, where n=1, 2, 3, ... for an armature having an even number of slots and where n=½, 3/2, 5/2, ... for an armature having an odd number of slots, the armature coils connected to said commutator bars to define a commutator circuit so that when one of the armature coils is under commutation by one of the brushes, the other coil sides of the first and second sub-coils thereof share common slots with, respectively, a coil side of a coil about to undergo commutation by the other of said brushes and a coil side of a coil having just completed commutation by the other of said brushes, at least some energy in said armature coil undergoing commutation by said first-mentioned brush being transferred across the armature coil to the aforementioned slots equal to said pitch n on the opposite side thereof from said first-mentioned brush by virtue of energy transferred from the sub-coils of said first armature coil undergoing commutation by said first-mentioned brush to the sub-coils of the armature coils about to undergo and having completed commutation by said other brush.

23. An electric motor of the commutator brush-type, said electric motor comprising:

an armature drum mounted for rotation about an axis;

a commutator defined by a plurality of commutator bars connected to said armature drum for rotation therewith;

means for establishing a field for said armature core;

first and second brushes supported for contact with said commutator to effect commutation; and a plurality of armature coils located on said armature drum, said coils connected to said commutator bars to define an armature circuit, each of said armature coils divided into first and second sub-coils each having first and second coil sides, the sub-coils of each armature coil distributed about said armature drum so that one coil side of each sub-coil of an armature coil share a common slot and so that the other coil side of a first sub-coil of an armature coil undergoing commutation by one of said brushes is coupled to a coil side of a sub-coil of another armature coil about to undergo commutation by the other brush and the other coil side of the second sub-coil of said armature coil undergoing commutation by the first-mentioned brush is coupled to a coil side of a sub-coil of still another armature coil having completed commutation by the other of said brushes.

24. The electric motor claimed in claim 23, wherein said coupling includes at least inductive coupling.

25. An electric motor of the commutator brush-type, said electric motor comprising:
an armature drum mounted for rotation about an axis, said armature drum having a plurality of slots distributed thereabout;
a commutator defined by a plurality of commutator bars connected to said armature drum for rotation therewith;
means for establishing a field of said armature drum;
first and second brushes supported for contact with said commutator to effect commutation; and
a plurality of armature coils located in said slots and connected to said commutator bars to define an armature circuit, each of said armature coils divided into first and second sub-coils with each of said sub-coils having two coil sides thereof, said armature coils distributed in said slots so that an armature coil, when undergoing commutation by one of said brushes, has one of the coil sides of its first and second sub-coils sharing a common slot and has the other coil sides of its first and second sub-coils in respective common slots with a coil side of another armature coil about to undergo commutation by the other brush and with a coil side of another armature coil having just completed commutation by said other brush.

26. An armature for an electric motor, said armature comprising:
an armature core having a plurality of slots distributed thereabout for receiving armature coils;
a commutator defined by a plurality of commutator bars connected to said armature core for rotation therewith; and
a plurality of armature coils located in said slots, said armature coils connected to said commutator bars to define an armature circuit, said armature coils divided into first and second coil halves with each coil half having two coil sides, said armature distributed in said slots so that an armature coil, when undergoing commutation by a first commutation means, has one of the coil sides of its first and second coil halves sharing a common slot and has the other coil sides of its first and second coil halves, respectively, in a common slot along with a coil side of a coil half of an armature coil about to undergo commutation by another commutation means and along with a coil side of a coil half of an armature coil having just completed commutation by said other commutation means.

* * * * *